(12) United States Patent
Kibuse

(10) Patent No.: US 7,200,617 B2
(45) Date of Patent: Apr. 3, 2007

(54) PROGRAM FOR MANAGING EXTERNAL STORAGE, RECORDING MEDIUM, MANAGEMENT DEVICE, AND COMPUTING SYSTEM

(75) Inventor: Yuuji Kibuse, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 10/272,242

(22) Filed: Oct. 16, 2002

(65) Prior Publication Data

US 2003/0078945 A1    Apr. 24, 2003

(30) Foreign Application Priority Data

Oct. 19, 2001    (JP)    ............... 2001-322808

(51) Int. Cl.
*G06F 12/02*    (2006.01)
(52) U.S. Cl. .................................... 707/200
(58) Field of Classification Search ............ 707/200, 707/204; 711/161, 162; 715/854; 718/103
See application file for complete search history.

(56) References Cited

U.S. PATENT DOCUMENTS

| 5,528,513 | A | * | 6/1996 | Vaitzblit et al. ............ 718/103 |
| 5,838,319 | A | * | 11/1998 | Guzak et al. ................ 715/854 |
| 5,875,478 | A | * | 2/1999 | Blumenau .................... 711/162 |
| 2003/0018657 | A1 | * | 1/2003 | Monday ..................... 707/204 |

FOREIGN PATENT DOCUMENTS

| JP | 04-098972 | 3/1992 |
| JP | 05-108440 | 4/1993 |
| JP | 11-232158 | 8/1999 |

OTHER PUBLICATIONS

"Symantec, the Norton Desktop, The Essential Set of Windows Utilities & Productivity Tools, Users Guide" Symantec Corp, 1993, 11 pages.*
Randy Appleton, "Kemel Korner: A Non-Technical Look Inside the EXT2 File System", vol. 1997, Issue 40es (Aug. 1997), Article No. 19, ISSN:1075-3583.*
Nikkei Mac, Aug. 8, 1999, "Instant Power User Training Lessons, Mastering Utilities, No. 43 Backup important Data Comfortably".
"Expedition of attractive software: No. 6, file management software 'disk explorer'", Yomiuri PC, Yomiuri Newspaper Cp., May 1, 1998. vol. 3. No. 5, 14-117.
Toshihiro Matsumoto, "Remarkable freeware/shareware, add-on software for Explore to easily modify attribute of files", Attribute changer (Ver.2.50a), Nikkei Windows 2000, Nikkei BP, Feb. 1, 2001. No. 47, p. 143.

* cited by examiner

*Primary Examiner*—Paul Rodriguez
*Assistant Examiner*—Luke Osborne
(74) *Attorney, Agent, or Firm*—Kunzler & Associates

(57) ABSTRACT

An external storage manager for managing an external storage storing one or more files and/or lower directories in association with a higher directory is disclosed, which causes computer to be equipped with directory acquiring means for acquiring a name of the higher directory, setting acquiring means for acquiring execution timing of a directory manager which manages the files and/or lower directories associated with the higher directory, directory displaying means for displaying on a screen the name of the higher directory acquired by the directory acquiring means, and setting displaying means for displaying on the screen the execution timing of the directory manager associated with the higher directory on condition that the higher directory displayed by the directory displaying means has been selected.

23 Claims, 10 Drawing Sheets

SETTING INFORMATION OF DIRECTORY A

| START | END | FREQUENCY: | LAST EXECUTION DATE / TIME | COMMAND LINE |
|---|---|---|---|---|
| 00/10/15 12:00 | — | ONCE | 00/10/15 12:00 | del ./* ··· |
| 00/11/01 20:00 | 01/03/30 20:00 | ONCE A WEEK | 00/12/06 20:00 | backup -a ··· |
| 00/11/01 20:00 | 01/03/30 20:00 | EVERY DAY | 00/12/07 20:00 | backup -i ··· |
| | | | | |
| | | | | |
| | | | | |
| | | | | |
| | | | | |

OK    CANCEL

FIG. 8

| i-NODE NUMBER | START | END | FREQUENCY | LAST EXECUTION DATE / TIME | COMMAND LINE |
|---|---|---|---|---|---|
| i-NODE NUMBER OF DIRECTORY A | 00/10/15 12:00 | — | ONCE | 00/10/15 12:00 | del ./* ··· |
| i-NODE NUMBER OF DIRECTORY A | 00/11/01 20:00 | 01/03/30 20:00 | ONCE A WEEK | 00/12/06 20:00 | backup -a ··· |
| i-NODE NUMBER OF DIRECTORY A | 01/11/01 20:00 | 01/03/30 20:00 | EVERY DAY | 00/12/07 20:00 | backup -i ··· |

FIG. 11

PROGRAM FOR MANAGING EXTERNAL STORAGE, RECORDING MEDIUM, MANAGEMENT DEVICE, AND COMPUTING SYSTEM

BACKGROUND OF THE INVENTION

1. The Field of the Invention

The present invention relates to a program for managing an external storage, a recording medium, a management device, and a computing system. Particularly, the invention relates to a program for managing an external storage to simplify file management operations by an administrator of the external storage, a recording medium, a management device, and a computing system.

2. Background Art

An administrator of an external storage can create settings for file sharing, access rights, etc. by specifying a file to be shared or accessed using a file manager such as Explorer in Windows.

The administrator of the external storage has to perform other file management operations such as backup, deletion, virus checking and extermination, compression and decompression, etc. in addition to the settings for file sharing and access rights. In these file management operations, since different operations are often required for the respective directories of the external storage, the administrator has to create a setting for each directory for each program. As a result, the file management operations become complicated.

SUMMARY OF THE INVENTION

In view of the above, it is an object of the present invention to provide a program for managing an external storage, a recording medium, a management device, and a computing system, by which the above problems can be resolved. This object is achieved by a combination of features recited in each independent claim. Dependent claims prescribe further advantageous implementations of the present invention.

According to a first aspect of this invention, a program for managing an external storage storing one or more files and/or lower directories in association with a higher directory is provided, said program causing a computer to be equipped with directory acquiring module for acquiring a name of said higher directory, setting acquiring module for acquiring execution timing of a directory manager which manages said files or said lower directories associated with said higher directory, directory displaying module for displaying on a screen said name of said higher directory acquired by said directory acquiring module, and setting displaying module for displaying on the screen said execution timing of said directory manager associated with said higher directory on condition that said higher directory displayed by said directory displaying module has been selected.

The program may further cause said computer to be equipped with setting inputting module for inputting a change of said setting information corresponding to said higher directory displayed by said setting displaying module, and setting changing module for updating said execution timing of said directory manager corresponding to said higher directory based on the contents of said inputted change.

Said external storage may store said execution timing relating to said higher directory in a storage area associated with said higher directory, and said setting changing module may cause said computer to update said execution timing stored in said storage area of said external storage.

Said external storage may store execution timings relating to plural higher directories of said external storage in a setting table provided in said storage area of said external storage, and said setting changing module may cause said computer to update said execution timings displayed by said setting displaying module, in said setting table of said external storage.

Said external storage may store said execution timing in a file system management area storing information used for management of a file by a file system which stores said file in said external storage in response to a request from an application program creating said file, and said setting changing module may cause said computer to update said execution timing displayed by said setting displaying module, in said file system management area of said external storage.

The program may further cause said computer to be equipped with backup processing module for acquiring said execution timing associated with said higher directory from said file system management area at the time of backup of said higher directory, and backing up said higher directory together with files and/or lower directories associated with said higher directory.

The program may further cause said computer to be equipped with backup restoring module for restoring said execution timing associated with said higher directory when said higher directory is restored in said external storage.

Said execution timing may comprise information to specify execution date and time when said directory manager is to be executed, and said program may further causes said computer to be equipped with execution module for executing said directory manager based on said specified execution date and time.

Said execution timing may comprise information to specify an execution interval for execution of said directory manager, and the program may further causes said computer to be equipped with execution module for executing said directory manager each time a period designated by said execution interval passes.

According to a second aspect of this invention, a recording medium storing one or more files and/or lower directories in association a higher directory is provided and, comprises a file system management area for storing information to be used by a file system to manage a file, said file system storing said file in said recording medium in response to a request from an application generating said file, and a file storage area for storing the contents of said file, wherein said file system management area includes a name part for storing a name of said higher directory, and a setting information part for storing information identifying execution timing of a directory manager which manages said files and/or said lower directories associated with said higher directory.

According to a third aspect of this invention, a computing system comprising an external storage storing one or more files and/or lower directories in association with a higher directory is provided, in conjunction with a management apparatus managing said external storage, wherein said external storage stores, in a storage area corresponding to said higher directory, execution timing of a directory manager managing said files and/or lower directories associated with said higher directory, and wherein said management apparatus includes directory acquiring module for acquiring a name of said higher directory, setting acquiring module for acquiring said execution timing associated with said higher directory, directory displaying module for displaying on a screen said name of said higher directory acquired by said directory acquiring module, and setting displaying module for displaying on the screen said execution timing of said directory manager associated with said higher directory on condition that said higher directory displayed by said directory displaying module has been selected.

It will be appreciated that the above-described outline of this invention does not enumerate all possible combinations of features according to this invention, and other combinations of these features are also included in the invention.

BRIEF SUMMARY OF THE INVENTION

FIG. 8 shows a setting display screen controlled by the external storage manager according to the embodiment of the invention.

FIG. 11 shows exemplary recording contents of a superblock area according to a modified embodiment of the invention.

PREFERRED EMBODIMENTS OF THE INVENTION

While the present invention will now be described with reference to the preferred embodiments thereof, the embodiments do not limit the claimed invention, and all combinations of features found in the embodiments are not necessarily indispensable for solving means of the invention.

Figure 1:
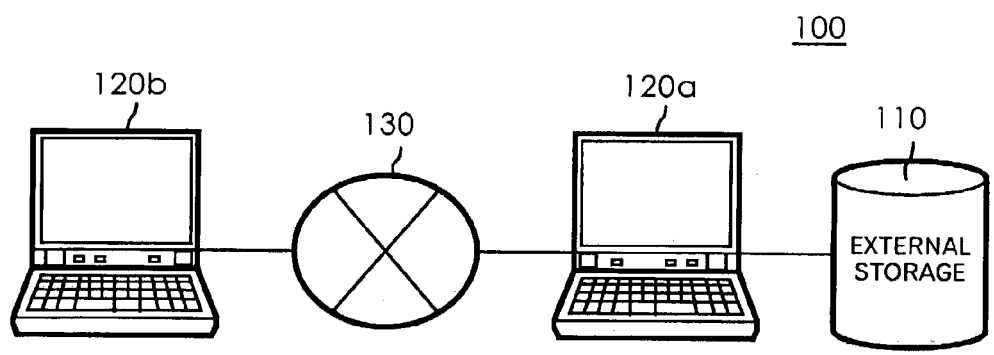
FIG. 1 shows an exemplary structure of a computing system 100 according to one embodiment of the invention.

FIG. 1 shows an exemplary structure of a computing system 100 according to one embodiment of the invention. The computing system 100 of this embodiment includes an external storage 110, a computer 120a, a computer 120b, and a network 130.

The external storage 110 stores files or directories in an internal storage area. The external storage 110 may be a recording medium for storing files, such as a hard disk, a floppy disk, a CD-ROM, a flash memory, an IC card memory, or a RAM for temporarily storing a file system.

The computer 120a receives an access request for the external storage 110 from the computer 120b through the network 130, and accesses the external storage 110. The external storage 110 may be a NAS (Network Attached Storage) having specific functions of the computer 120a, i.e., communication function for connection to the network 130, and access processing function for connection to the external storage 110. In this case, the external storage 110 may be directly connected to the network 130.

The computer 120b runs an external storage manager for managing the external storage 110. The external storage manager is an exemplary program according to the invention. An administrator of the external storage 110 operates the computer 120b to cause the external storage manager to perform various file management operations.

The network 130 connects the computer 120a and the computer 120b. The network 130 may be, for example, a public communication network such as the Internet or public telephone network, a private network such as a local area network or SAN (Server Area Network), or a combination thereof. Also, the computer 120b rather than the computer 120a in this embodiment may directly access the external storage 110 without any intervening network.

Figure 2:
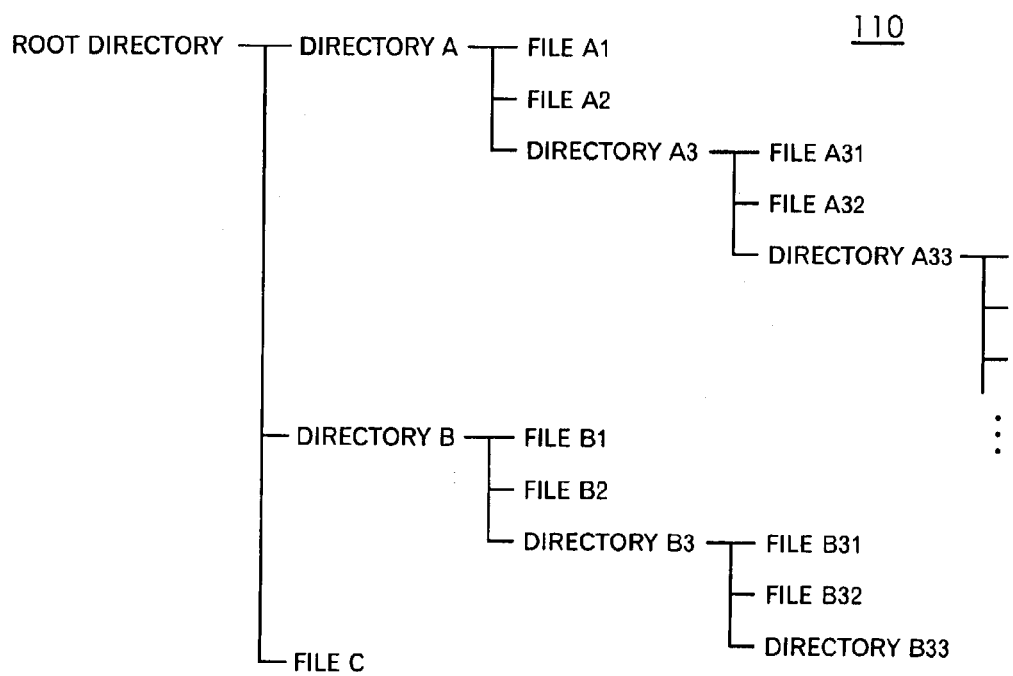
FIG. 2 shows schematically an exemplary directory structure of an external storage according to the embodiment of the invention.

FIG. 2 shows an exemplary directory structure of the external storage 110 according to the embodiment of the invention. As shown in FIG. 2, the external storage 110 stores files and directories in a hierarchical manner. The directory of this invention includes information or entry for associating with one or more files and/or lower directories to be stored in the hierarchical manner. Therefore, any information or entry for implementing such a function is equivalent to the directory of the invention even if it has a different name such as folder.

A 'root directory' is a directory positioned at the top in the external storage 110. In FIG. 2, a 'directory A', a 'directory B', and a 'file C' are stored in the external storage 110 in association with the 'root directory'. Such association may be expressed as "the 'root directory' is a higher directory of the 'directory A', the 'directory B', and the 'file C'" or "the 'directory A' and the 'directory B' are lower directories of the 'root directory'".

Similarly, in FIG. 2, a 'file A1', a 'file A2', a 'directory A3', 'file A31', a 'file A32', a 'directory A33', a 'file B1', a 'file B2', a 'directory B3', a 'file B31', a 'file B32', and a 'directory B33' are stored in the external storage 110 such that the 'file A1', the 'file A2', and the 'directory A3' are associated with the 'directory A' which is a higher directory thereof, the 'file A31', the 'file A32', and the 'directory A33' are associated with the 'directory A3' which is a higher directory thereof, the 'file B1', the 'file B2', and the 'directory B3' are associated with the 'directory B' which is a higher directory thereof, and the 'file B31', the 'file B32', and the 'directory B33' are associated with the 'directory B3' which is a higher directory thereof.

Figure 3:
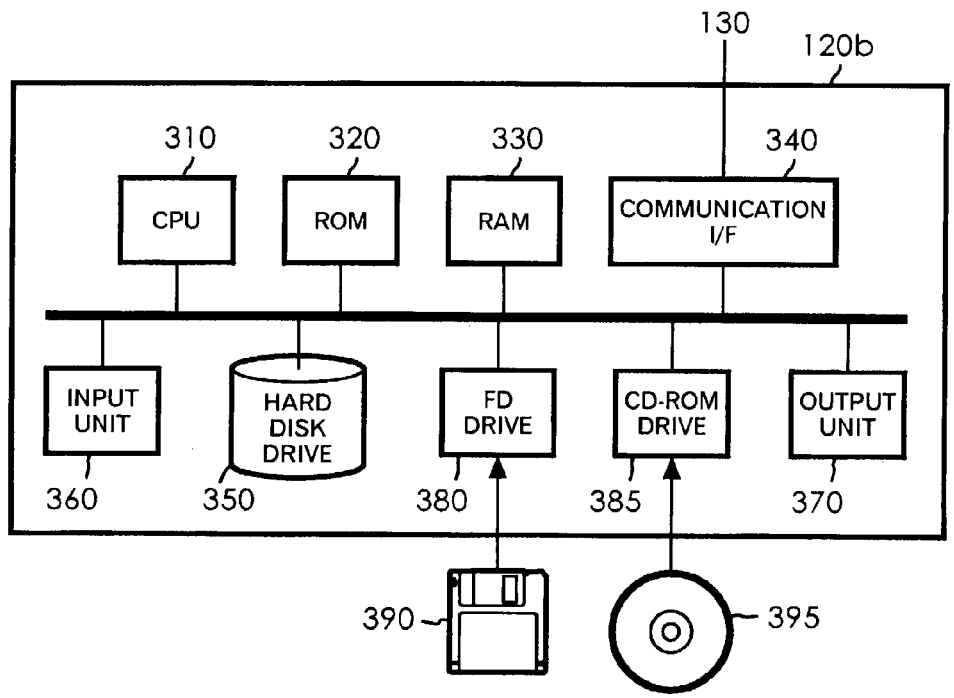
FIG. 3 shows schematically an exemplary a hardware structure of a computer according to the embodiment of the invention.

FIG. 3 shows an exemplary hardware structure of the computer 120b according to the embodiment of the invention. The computer 120b of this embodiment includes a CPU 310, a ROM 320, a RAM 330, a communication interface 340, a hard disk drive 350, an input unit 360, an output unit 370, a floppy disk drive 380, and a CD-ROM drive 385. The computer 120b runs the external storage manager for managing the external storage 110 in cooperation with the CPU 310, the ROM 320, the RAM 330, the communication interface 340, the hard disk drive 350, the input unit 360, the output unit 370, the floppy disk drive 380, and/or the CD-ROM drive 385.

The external storage manager may be stored on an external recording medium which may be, in addition to the floppy disk 390 or the CD-ROM 395, an optical recording medium such as a DVD or a PD, a magneto-optical recording medium such as an MD, a tape medium, or a semiconductor memory such as an IC card. Alternatively, the external storage manager may be previously stored in the external storage 110 shown in FIG. 1, and provided to the computer 120*b* through the network 130.

Figure 4:
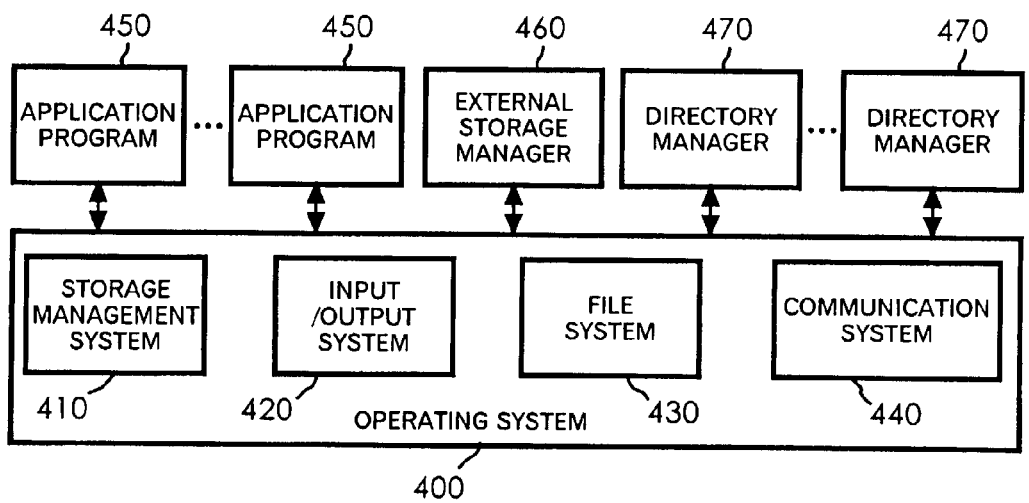
FIG. 4 shows schematically a software structure of the computer according to the embodiment of the invention.

FIG. 4 shows an exemplary software structure of the computer 120*b* according to the embodiment of this invention. The computer 120*b* of this embodiment executes an operating system 400, one or more application programs 450, an external storage manager 460, and one or more directory managers 470.

The operating system 400 controls various hardware devices of the computer 120*b*, such as the CPU 310, the ROM 320, the RAM 330, the communication interface 340, the hard disk drive 350, the input unit 360, the output unit 370, the floppy disk drive 380, and the CD-ROM drive 385, and supports program operations in the computer 120*b*.

The operating system 400 includes a storage management system 410, an input/output system 420, a file system 430, and a communication system 440.

The storage management system 410 allocates the RAM 330 in the computer 120*b* to the operating system 400, the application programs 450, the external storage manager 460, and the directory managers 470 running on the computer 120*b*.

The input/output system 420 supports input/output of the input unit 360 and the output unit 370 for each program running on the computer 120*b*.

The file system 430 supports file input/output to/from the hard disk drive 350, the floppy disk drive 380, the CD-ROM drive 385, and the external storage 110, for each program running on the computer 120*b*. With respect to each of the hard disk drive 350, the floppy disk drive 380, the CD-ROM drive 385 and the external storage 110, the file system 430 performs the file input/output by using a file system management area for storing information used for management of files and directories in that storage device, and a file storage area for storing contents of files in that storage device.

The communication system 440 supports communication through the communication interface 340. The application programs 450, the external storage manager 460 and the directory managers 470 use inter-process communication such as system call to use the functions of the operating system 400, i.e., the storage management system 410, the input/output system 420, the file system 430, and the communication system 440.

Each of the application programs 450 is run on the computer 120*b* by a user of the computer 120*b*. When an application program 450 has created a file, it uses, for example, the system call to request the file system 430 to store the file in the hard disk drive 350, the floppy disk drive 380, or the external storage 110. In response thereto, the file system 430 stores the file created by the application program 450 in the hard disk drive 350, the floppy disk drive 380, or the external storage 110.

The directory manager 470 causes the computer 120*b* to perform management operations for the files and/or lower directories associated with each directory. The directory manager 470 causes the computer 120*b* to perform, as the management operations for the files or the lower directories, various processings of referring to attributes, such as name, size, date and time of creation, date and time of update, existence of sharing, access right or number of files, or file content. The directory manager 470 may also cause the computer 120*b* to perform, as the management operations for the files or the lower directories, various processings having indirect influence on the files or the lower directories, such as settings of attributes of the existence of sharing or access right to a higher directory. That is, the directory manager 470 may cause the computer 120*b* to perform, as the management operations, various processings including, for example, backup, deletion, check and extermination of computer virus, compression and decompression, in addition to the settings of the sharing and the access right for the file or directory.

The external storage manager 460 is a program used by the administrator of the external storage 110 to manage the external storage 110. The external storage manager 460 causes the computer 120*b* to perform processings such as displaying a name of each directory on the external storage 110, displaying and changing setting information associated with each directory on the external storage 110, and starting the directory manager 470 based on the setting information associated with each directory on the external storage 110. The external storage manager 460 of this embodiment uses the setting information including information for specifying execution timing for a directory manager 470, a directory manager 470 to be executed, and a parameter given to the directory manager 470. The parameter given to the directory manager 470 is information for specifying the operation of the directory manager 470 to be executed, such as full or incremental backup by the backup program. The external storage 110 stores the setting information of this embodiment in a file system management area which is a storage area of the external storage 110.

Figure 5:
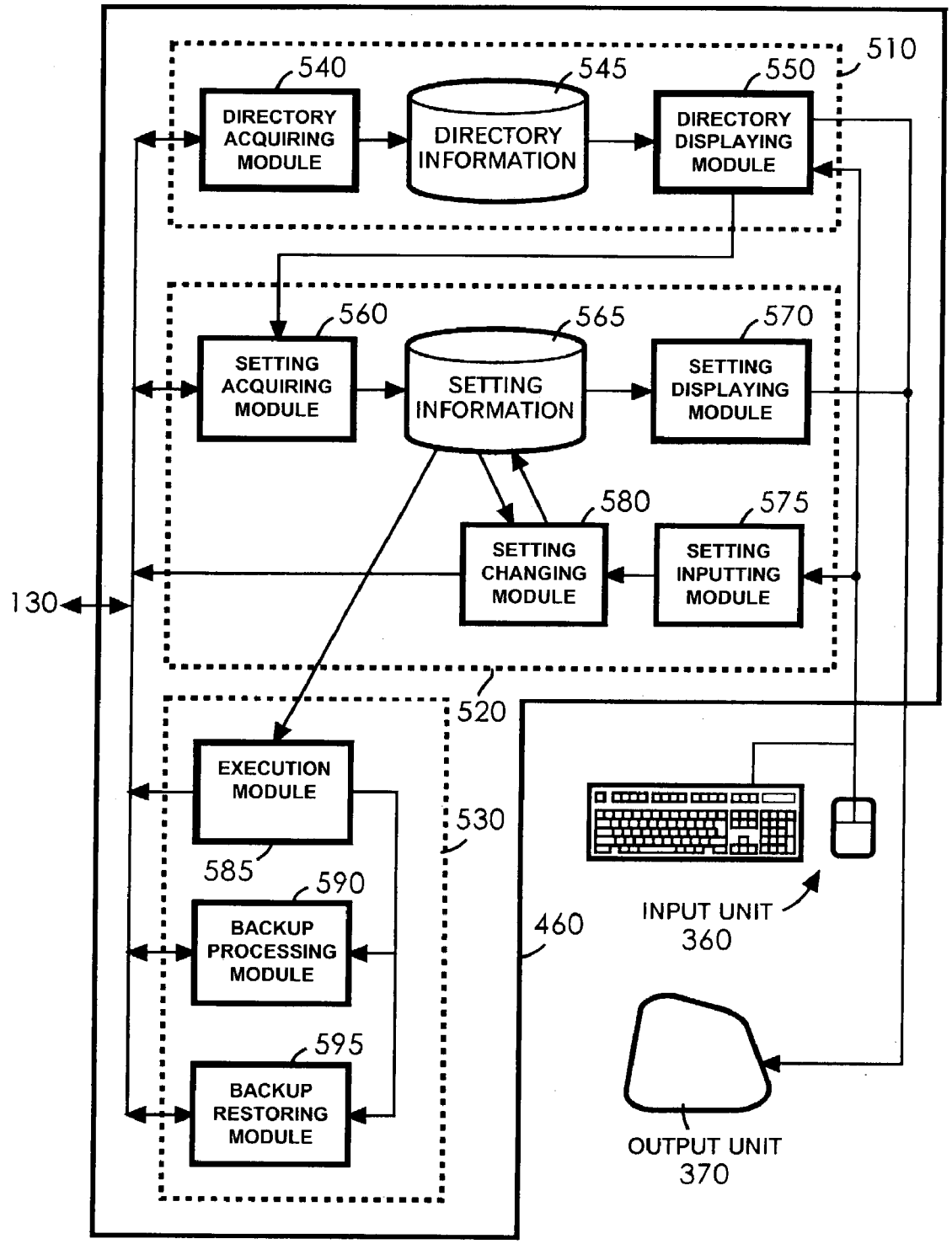
FIG. 5 shows schematically a structure of an external storage manager according to the embodiment of the invention.

FIG. 5 shows an exemplary structure of the external storage manager 460 according to the embodiment of the invention. The computer 120*b* reads the external storage manager 460 from the recording medium to run the external storage manager 460.

The external storage manager 460 according to this embodiment includes a directory display processing part 510, a directory setting processing part 520, and a directory management part 530.

The directory display processing part 510 causes the computer 120*b* to display a name of each higher directory on the external storage 110. The directory display processing part 510 includes directory acquiring module 540, directory information 545, and directory displaying module 550.

The directory acquiring module 540 accesses the external storage 110 through the file system 430 to acquire directory information including the name of the higher directory on the external storage 110.

The directory information 545 is storage for temporarily storing the directory information acquired by the directory acquiring module 540.

The directory displaying module 550 reads the directory information acquired by using the directory acquiring module 540 from the directory information 545, and displays it on the screen of the output unit 370. When a higher directory displayed by the directory displaying module 550 is selected by the administrator of the external storage 110 through the input unit 360, the directory displaying module 550 instructs setting acquiring module 560 in the directory setting processing part 520 to display the setting information associated with the selected higher directory.

The directory setting processing part 520 causes the computer 120*b* to display and change the setting information associated with each directory on the external storage 110. The directory setting processing part 520 includes the setting acquiring module 560, setting information 565, setting displaying module 570, setting inputting module 575, and setting changing module 580.

The setting acquiring module 560 receives the instruction from the directory displaying module 550, and accesses the external storage 110 to acquire the setting information including the execution timing of the directory manager for performing the management operation for the file or the lower directory associated with the selected higher directory. The setting acquiring module 560 also accesses the external storage 110 to acquire the setting information in order to cause execution module 585 to, for example, start the directory manager 470 based on the setting information associated with each higher directory in the external storage 110.

The setting information 565 is storage module for temporarily storing the setting information acquired by the setting acquiring module 560.

The setting displaying module 570 causes the setting information including the execution timing of the directory manager associated with the selected higher directory to be displayed on the screen of the output unit 370 based on the instruction given to the setting acquiring module 560 from the directory displaying module 550.

The setting inputting module 575 allows the administrator of the external storage 110 to change the setting information corresponding to the selected higher directory through the input unit 360.

The setting changing module 580 updates the setting information in the setting information 565 based on the changed contents of the setting information inputted. The setting changing module 580 also accesses the external storage 110 to update the setting information corresponding to the selected higher directory in the external storage 110.

The directory management part 530 performs processing such as startup of the directory manager 470 based on the setting information associated with each higher directory on the external storage 110, and backup and restoration of the setting information. The directory management part 530 includes the execution module 585, backup processing module 590, and backup restoring module 595.

The execution module 585 acquires the setting information associated with each higher directory from the setting information 565, and causes the computer 120*b* to execute the directory manager 470 based on the execution timing in the setting information. In the case where the execution timing specifies the data and time for execution of the directory manager 470, the execution module 585 causes the directory manager 470 to be executed based on the specified data and time of the execution. Also, in the case where the execution timing specifies an execution interval for execution of the directory manager 470, the execution module 585 causes the directory manager 470 to be executed each time the period designated by the execution interval according to the execution timing passes.

The backup processing module 590 accesses the external storage 110 at the time of backup of the higher directory on the external storage 110 to acquire the setting information, such as the execution timing, associated with the higher directory from the file system management area. The backup processing module 590 provides the acquired setting information to a backup program, and causes it to back up the higher directory together with one or more files and/or lower directories associated therewith.

When restoring the higher directory backed up in the external storage 110, the backup restoring module 595 acquires the setting information, such as the execution timing, associated with the higher directory from a program for restoring the backed up data. The backup restoring module 595 accesses the external storage 110 and restores the acquired setting information in a portion in the file system management area corresponding to the higher directory.

The computer 120*b*, which runs the external storage manager 460 of this embodiment, functions as a management device for implementing the function of the external storage manager 460. A directory acquiring part, a directory displaying part, a setting acquiring part, a setting displaying part, a setting inputting part, a setting changing part, an execution part, a backup processing part, and a backup restoring part included in the management device respectively provide functions which the directory acquiring module 540, the directory displaying module 550, the setting acquiring module 560, the setting displaying module 570, the setting inputting module 575, the setting changing module 580, the execution module 585, the backup processing module 590, and the backup restoring module 595 in the external storage manager 460 cause the computer 120*b* to perform.

Figure 6:
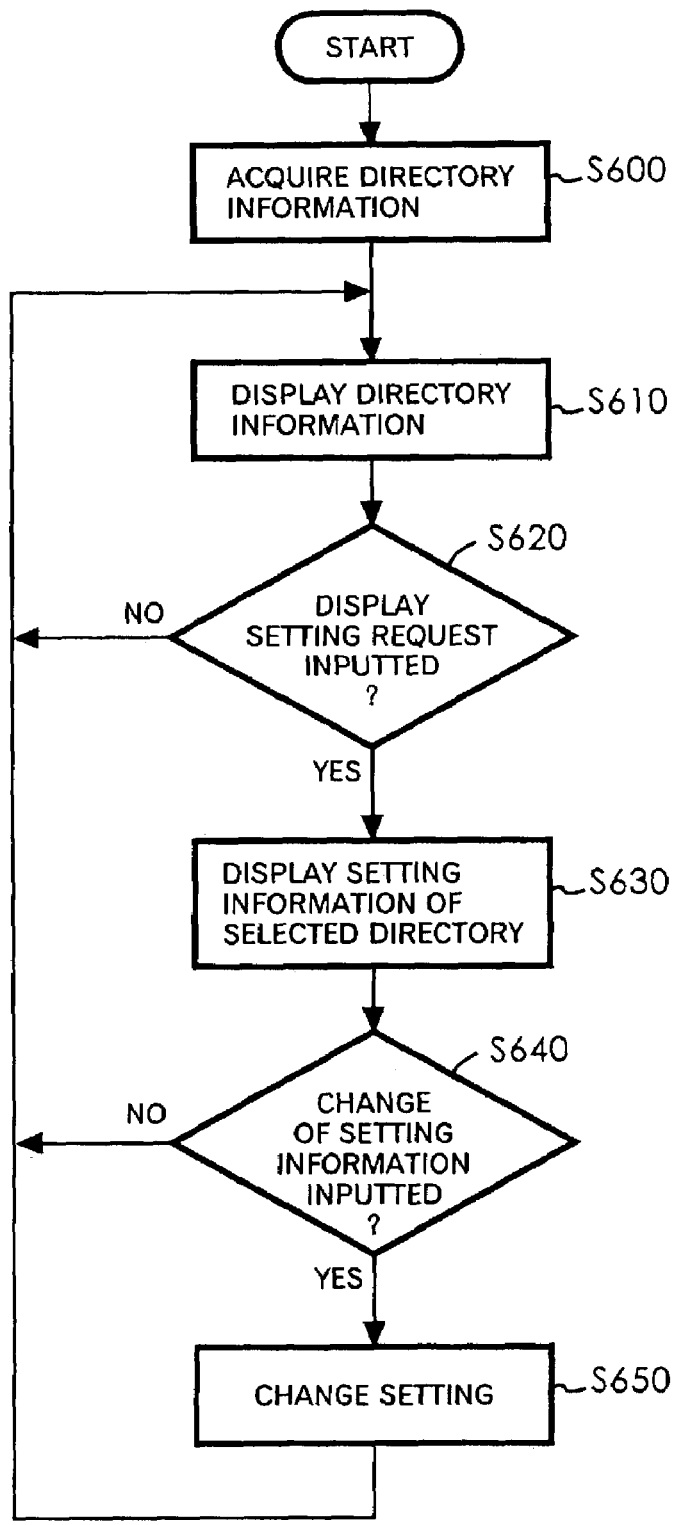
FIG. 6 is a flowchart showing a setting process of the external storage manager according to the embodiment of the invention.

FIG. 6 shows a flow of a setting process of the external storage manager 460 according to the embodiment of the invention.

First, the directory acquiring module 540 causes the computer 120*b* to acquire directory information including names of higher directories and the like from the external storage 110 (S600). The directory information 545 stores the directory information acquired by the directory acquiring module 540. Next, the directory displaying module 550 reads the directory information from the directory information 545, and causes the names of the higher directories to be displayed on the screen of the output unit 370 (S610).

Next, when one of the displayed higher directories is selected by the administrator of the external storage 110 so as to display the setting information including information to specify an execution timing for execution of a directory manager 470, a directory manager 470 to be executed, and a parameter given to the directory manager 470, the directory displaying module 550 instructs the setting acquiring module 560 to display the setting information associated with the selected higher directory (S620). Here, if an instruction other than the instruction to display the setting information for the selected higher directory, for example, an instruction to display a list of files and/or lower directories associated with another higher directory is received from the administrator of the external storage 110, the directory displaying module 550 causes the process to proceed to S610 and updates the screen.

Next, the setting acquiring module 560 causes the computer 120*b* to acquire the setting information associated with the higher directory selected based on the instruction from the directory displaying module 550. The setting information 565 stores the setting information acquired by the setting acquiring module 560. Next, based on the instruction received from the directory displaying module 550 at S620, the setting displaying module 570 reads the setting information associated with the selected higher directory from the setting information 565, and causes it to be displayed on the screen of the output unit 370 (S630).

Next, the setting inputting module 575 allows the administrator of the external storage 110 to input a change of the setting information displayed by the setting displaying module 570 (S640). Here, if an instruction other than the instruction to change the setting information, for example, an instruction to close a window displaying the setting information, or an instruction to display a list of files and/or lower directories associated with another higher directory is received from the administrator of the external storage 110, the setting inputting module 575 causes the process to proceed to S610 and updates the screen.

Next, based on the contents of the change of the setting information inputted through the setting displaying module 570, the setting changing module 580 updates the setting information in the setting information 565. The setting changing module 580 accesses the external storage 110, and updates the setting information corresponding to the selected higher directory in the external storage 110 (S650).

Figure 7:
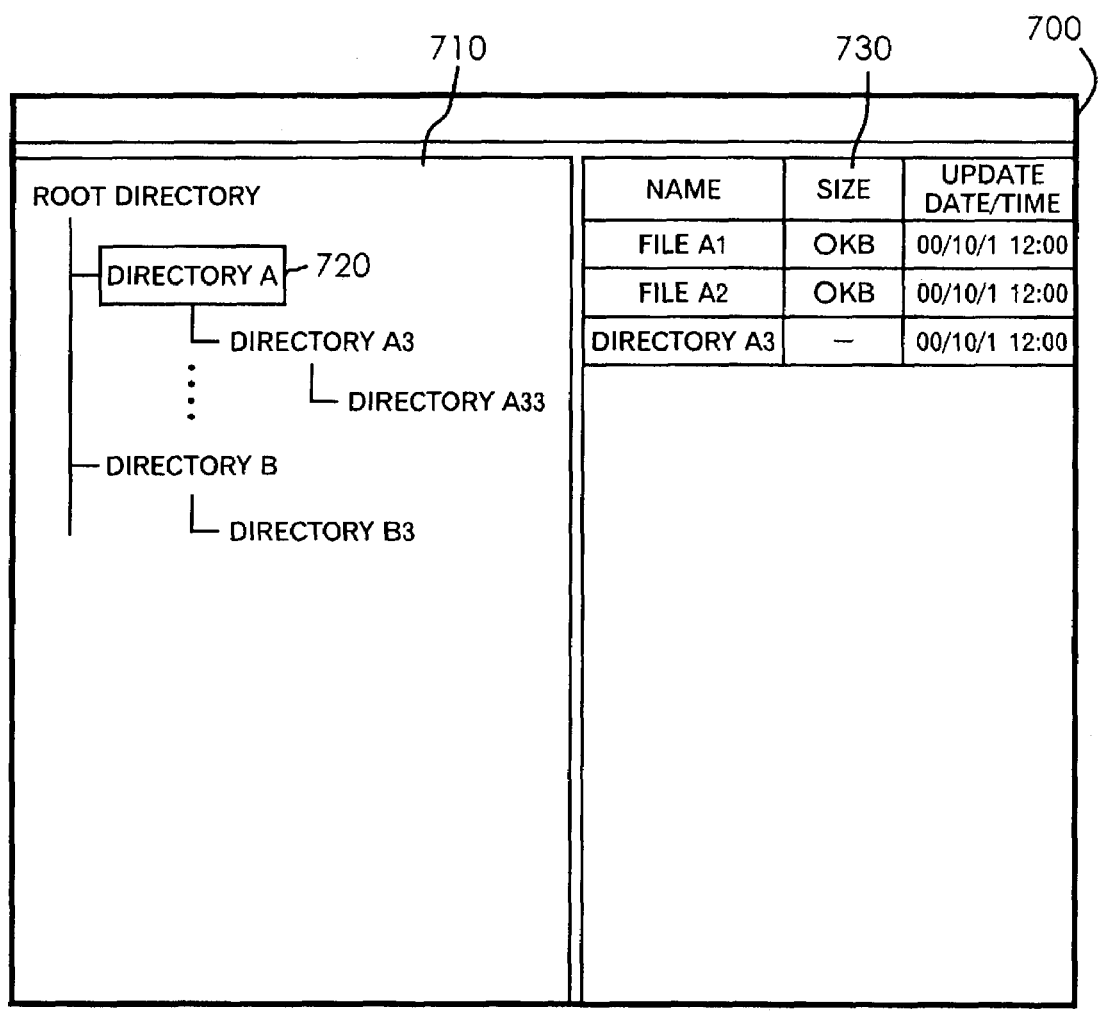
FIG. 7 shows a file display screen controlled by the external storage manager according to the embodiment of the invention.

FIG. 7 shows a file display screen 700 controlled by the external storage manager 460 according to the embodiment of the invention. The file display screen 700 of this embodiment includes a directory structure display part 710 and a directory content display part 730.

The directory structure display part 710 displays a hierarchical structure of directories on the external storage 110. The directory display processing part 510 in the external storage manager 460 causes the computer 120b to acquire the directory information of each higher directory in the external storage 110, to make the names of the higher directories hierarchical, and to display them on the screen of the output unit 370.

When one of the higher directories displayed on the directory structure display part 710 is selected by the administrator of the external storage 110, the directory displaying module 550 causes the selected higher directory to be highlighted by a higher directory selection mark 720.

The directory content display part 730 uses the directory structure display part 710 to display a list of files and/or lower directories associated with the selected higher directory. In this embodiment, the directory content display part 730 displays the name, size and update date and time of each of the files and/or lower directories associated with the selected higher directory.

In this embodiment, FIG. 7 illustrates the file display screen 700 in a case where the administrator of the external storage 110 uses the input unit 360 to select the 'directory A'. When the 'directory A' is selected, the directory displaying module 550 causes the name, size and update date and time of each of the 'file A1', the 'file A2', and the lower directory or 'directory A3', which are associated with the 'directory A', to be displayed on the directory content display part 730.

FIG. 8 shows a setting display screen 800 controlled by the external storage manager 460 according to the embodiment of the invention. When an instruction to display the setting information of the higher directory selected on the file display screen 700 is issued, the setting displaying module 570 displays the setting display screen 800 on the output unit 370. In the case where the administrator of the external storage 110 has performed a predetermined operation, the setting inputting module 575 regards the instruction to display the setting information of the selected higher directory as having been issued. That is, for example, in the case where the administrator of the external storage 110 has moved a cursor of a mouse as an example of the input unit 360 onto the higher directory selection mark 720 and clicks the left button of the mouse, the setting inputting module 575 regards the instruction to display the setting information of the higher directory highlighted by the higher directory selection mark 720 as having been issued.

The setting display screen 800 of this embodiment includes a setting information table 810, an OK button 820, and a cancel button 830.

The setting information table 810 is a table for the external storage manager 460 to display the contents of setting information to specify execution timing for execution of a directory manager 470 associated with the selected higher directory, a type of the directory manager 470 to be executed, a parameter given to the directory manager 470, and the like.

The setting information table 810 includes a start field, an end field, a frequency field, a last execution date and time field, and a command field.

The start field, the end field, and the frequency field define setting information to specify the execution timing at which the execution module 585 causes the directory manager 470 to be executed. The start field specifies the date and time when the execution module 585 starts the operation of the directory manager 470 specified in the command line field. The end field specifies the end date and time of the period in which the execution module 585 performs the operation of the directory manager 470 specified in the command line field. The frequency field specifies an execution interval at which the execution module 585 performs the operation of the directory manager 470 specified in the command line field, by using a form of, for example, once, once a week, every day, every four hours, etc.

The last execution date and time field indicates the date and time when the last operation of the directory manager 470 specified in the corresponding line was performed.

The command line field specifies a type of each directory manager 470 which the execution module 585 causes the computer 120b to execute, and a parameter given to that directory manager 470. The setting information table 810 of this embodiment stores the type of the directory manager 470 to be executed, and the parameter to be given to the directory manager 470 in a format which can be interpreted by a command execution program of the operating system 400 (e.g., the MS-DOS® operating system prompt or command prompt in the Microsoft Windows® operating system, a shell command in the UNIX® operating system, etc.). For example, the first line of the setting information table 810 shows 'del' indicating that the type of the directory manager 470 to be executed is a delete program. The parameter given to 'del' includes '/' indicating the deletion of all files and/or lower directories associated with the higher directory. Besides, for example, the second and third lines of the setting information table 810 show 'backup' indicating that the type of the directory manager 470 to be executed is a backup program. The parameter given to 'backup' at the second line of the setting information table 810 includes '−a' to specify a full backup. At the third line of the setting information table 810, the parameter given to 'backup' includes '−i' to specify an incremental backup.

The administrator of the external storage 110 sets each of the start field, the end field, the frequency field, and the command line field, so that various execution timings and processing contents can be specified. For example, the first line of the setting information table 810 indicates that the directory manager 470 for performing 'delete all' of files associated with the 'directory A' is executed at 12:00 of Oct. 15, 2000. Also, the second line of the setting information table 810 indicates that the directory manager 470 for performing 'full backup' of files associated with the 'directory A' is executed at an execution interval of once a week in a period between 20:00 of Nov. 1, 2000 and 20:00 of Mar. 30, 2001. Further, the third line of the setting information table 810 indicates that the directory manager 470 for performing 'incremental backup' of files associated with the 'directory A' is executed every day in a period between 20:00 of Nov. 1, 2000 and 20:00 of Mar. 30, 2001. The administrator of the external storage 110 can select each field in the setting information table 810 to input a change.

The OK button 820 is a button for the administrator of the external storage 110 to give an instruction to cause the change inputted to the setting information table 810 to be reflected. When the OK button 820 is pressed, the setting changing module 580 updates the setting information 565 and corresponding setting information in the external storage 110 based on the contents of the inputted change.

The cancel button 830 is a button for the administrator of the external storage 110 to give an instruction to cancel the change inputted to the setting information table 810.

Figure 9:
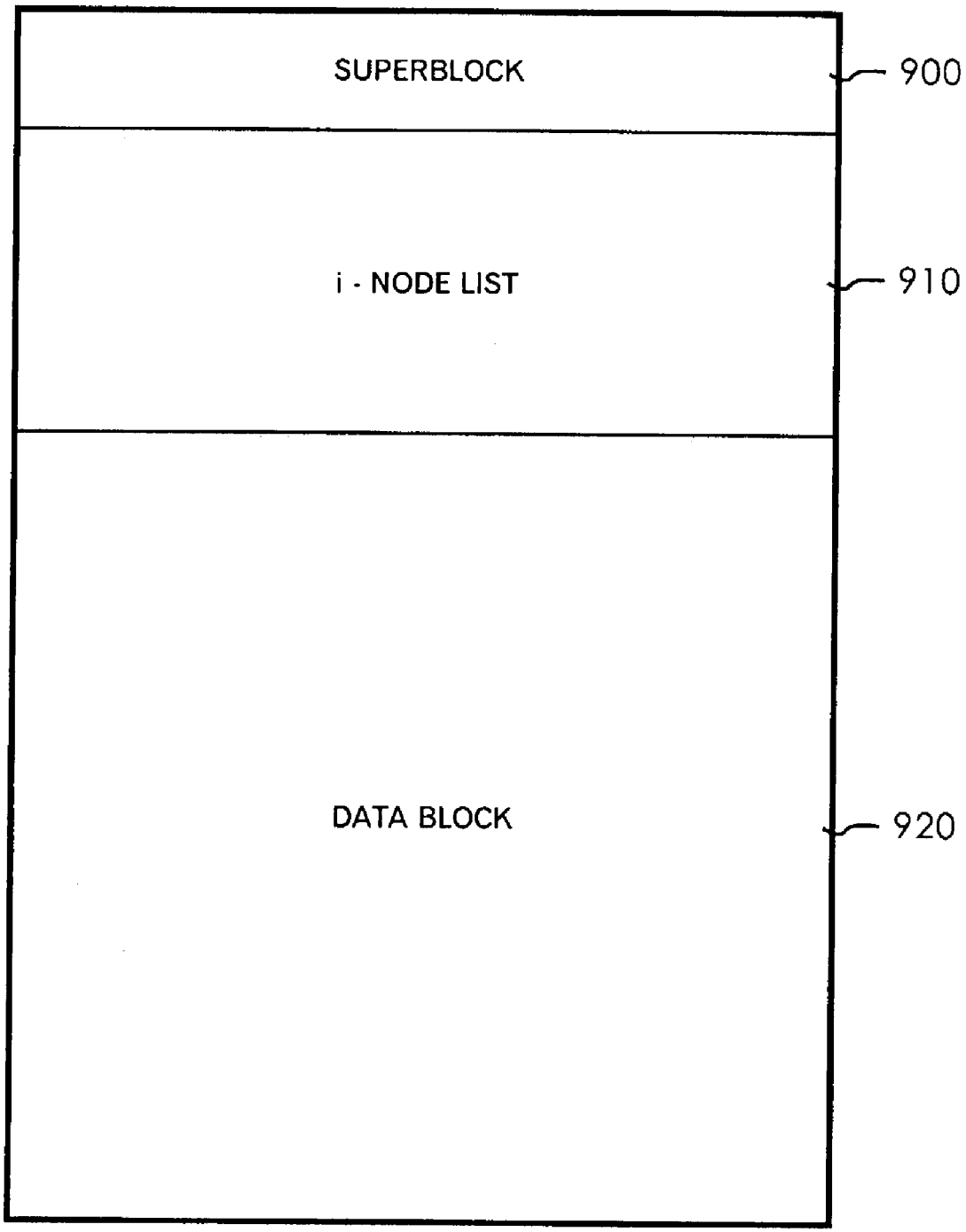
FIG. 9 shows a structure of storage areas of the external storage according to the embodiment of the invention.

FIG. 9 shows a structure of storage areas of the external storage 110 according to the embodiment of the invention. The storage areas of the external storage 110 of this embodiment include a superblock area 900, an i-node list area 910, and a data block area 920.

The superblock area 900 is a file system management area for storing management information including the capacity of the external storage 110, the size of an empty area in the external storage 110, the size of the i-node list area 910, etc. The i-node list area 910 is a file system management area for storing a corresponding i-node for each file or directory stored in the external storage 110. An i-node corresponding to a file or directory holds information specifying an owner of the file or the directory, security, size, update date and time, and position of the data block area 920 holding the contents of the file or the directory.

The data block area 920 is a storage area for holding the contents of a file or a directory. The external storage 110 stores a directory by using an i-node corresponding to that directory, and a storage area in the data block area 920 whose position is specified by that i-node, which holds names of files and/or lower directories associated with that directory. That is, the storage area in the data block area 920 for storing the information relating to the directory is used as a file system management area. Also, the external storage 110 stores a file by using an i-node corresponding to that file and the contents of the file arranged in the data block area 920 and specified by the i-node. That is, the storage area in the data block area 920 for storing the information relating to the file is used as a file storage area for storing the contents of the file.

The structure of storage areas of the external storage 110 shown in FIG. 9 may vary depending on the operating system and file format to be used. Even in such a case, the operating system storing files and/or lower directories in association with a higher directory includes a file system management area for storing file management information used for management of files and directories, and a file storage area for storing file contents.

For example, the FAT file system in Windows includes a file allocation table area and a data area different from the file allocation table area on the external storage. In the FAT file system, the file allocation table area and a storage area for storing directory information in the data area are examples of the file system management area. Also, a storage area for storing file contents in the data area is an example of the file storage area.

Further, for example, the NTFS file system in Windows includes an MFT (Master File Table) area and a data area different from the MFT area on the external storage. A file in the NTFS file system has plural attributes and attribute values corresponding to the respective attributes. Such attributes include, for example, a file name attribute indicating a file name, a security attribute describing security information, and a data attribute as file contents.

In the NTFS file system, a storage area in the MFT area other than the data attribute value holding the file contents, and a storage area in the data area other than the data attribute value are examples of the file system management area. Also, a storage area for storing the data attribute value holding the file contents in the MFT area, and a storage area for storing the data attribute value in the data area are examples of the file storage area.

Figure 10:
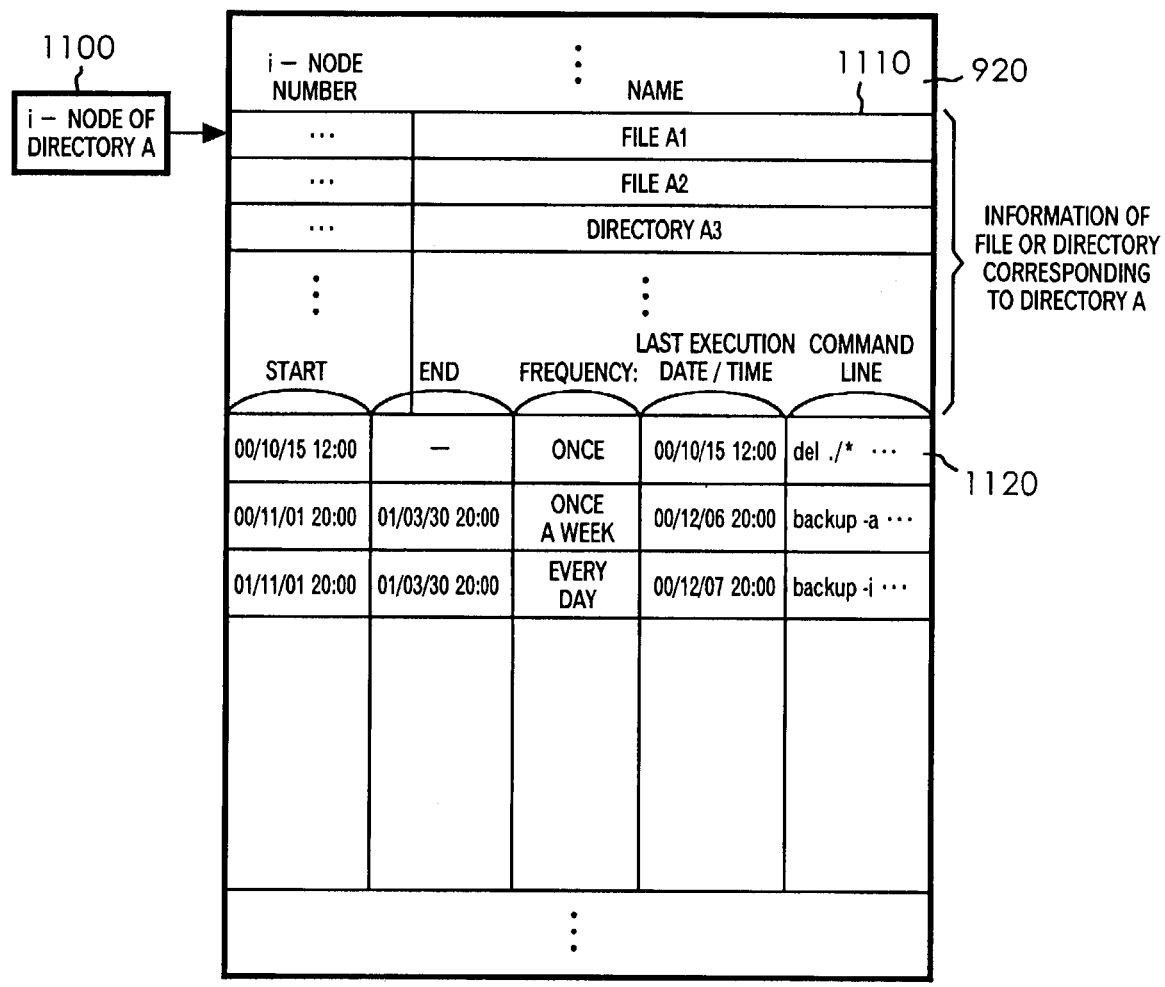
FIG. 10 shows exemplary recording contents of the external storage according to the embodiment of the invention.

FIG. 10 shows exemplary recording contents of the external storage 110 according to the embodiment of the invention. The external storage 110 of this embodiment stores setting information associated with a higher directory in a file system management area which is a storage area associated with the higher directory in the data block area 920.

An i-node 1100 is an i-node of the 'directory A' existing in the i-node list area 910. The i-node 1100 includes information for specifying positions of a name part 1110 and a setting information part 1120 stored in the data block area 920. The name part 1110 is a file system management area which holds names of files and/or lower directories associated with the 'directory A'. The setting information part 1120 is a file system management area which stores the setting information associated with the 'directory A'. Each field of the setting information part 1120 stores the data of the corresponding field of the setting information table 810.

According to the storage format of the setting information described above, when the directory acquiring module 540 acquires directory information including names of files and/or lower directories associated with a higher directory from the name part 1110, the setting acquiring module 560 can acquire the contents of the setting information part 1120 stored in the vicinity of the name part 1110. Alternatively, when the directory acquiring module 540 acquires the directory information including the names of the files and/or the lower directories associated with the higher directory from the i-node 1100, the file system 430 can prefetch the setting information part 1120 and store it in a disk cash managed by the file system 430. Therefore, according to the storage format of the setting information described above, the external storage manager 460 can efficiently acquire the setting information associated with the higher directory.

Also, according to the storage format of the setting information described above, the setting information is stored in the file system management area. Therefore, according to the storage format of the setting information, it is possible to prevent someone other than the administrator of the external storage 110 or something other than the external storage manager 460 from reading, changing or deleting the setting information.

FIG. 11 shows exemplary recording contents of the superblock area 900 according to a modified embodiment of the invention. The superblock area 900 of this embodiment has a setting table 1010 including setting information associated with plural higher directories in the external storage 110.

The setting table 1010 stores the setting information including execution timings relating to plural directories in the external storage 110. The setting table 1010 includes an i-node number field in addition to the fields of the setting information table 810. The i-node number field specifies a higher directory, with which the setting information of that line is associated, by using an i-node number.

When the setting information of the selected higher directory is updated, the setting acquiring module 560 causes the setting information of the higher directory to be acquired from the setting table 1010 in the external storage 110. Then, the setting changing module 580 acquires the setting information stored in the setting information 565, changes it, and updates the setting information for the higher directory in the setting table 1010. If the setting table 1010 does not store the setting information relating to the higher directory, the setting changing module 580 secures an area in the setting table 1010, and stores the setting information inputted through the setting inputting module 575.

According to the storage format of the setting information described above, the setting acquiring module 560 can acquire the setting information associated with all higher directories on the external storage 110 by acquiring the setting table 1010 stored in the superblock area 900 of the external storage 110.

Also, according to the storage format of the setting information described above, the setting information is stored in the file system management area. Therefore, according to the storage format of the setting information described above, it is possible to prevent someone other than the administrator of the external storage 110 or something other than the external storage manager 460 from reading, changing or deleting the setting information.

Figure 12:
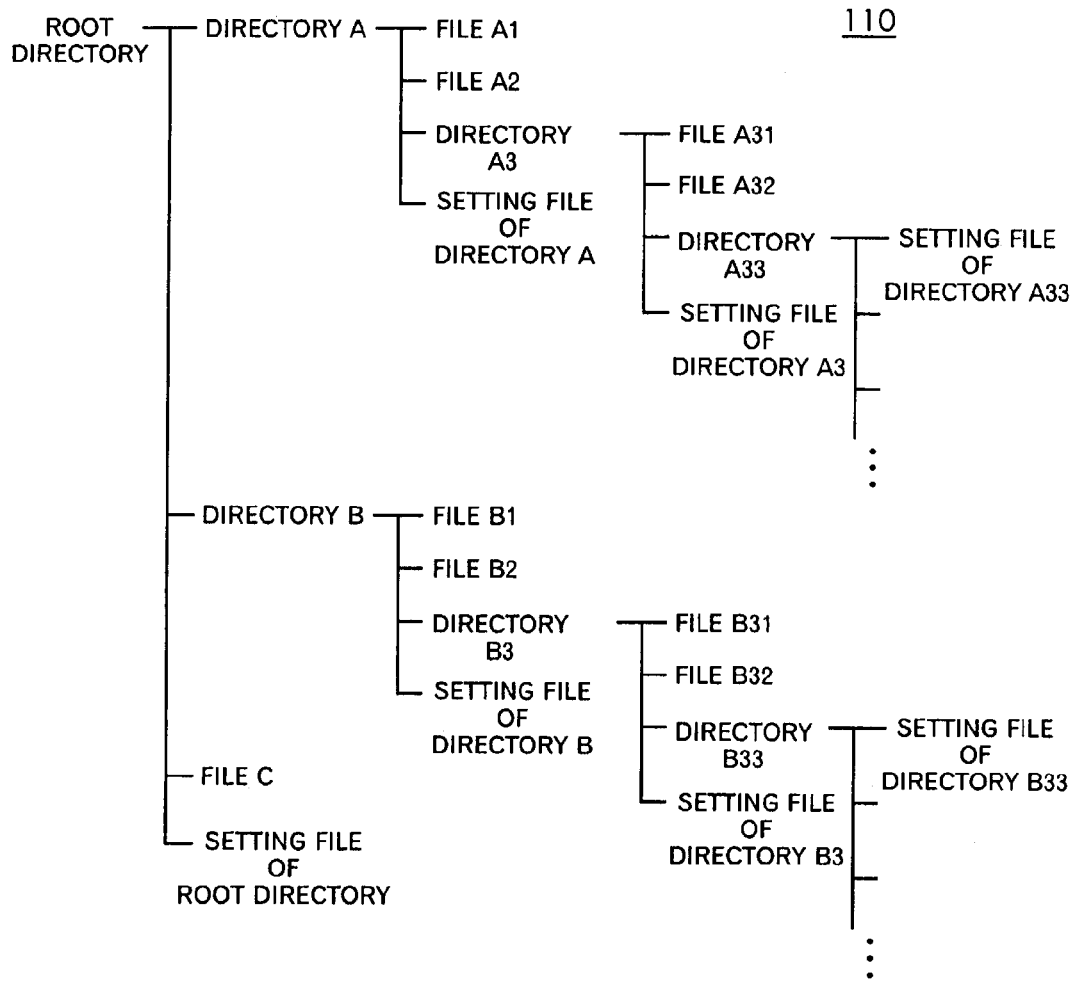
FIG. 12 shows an exemplary directory structure of the external storage according to another modified embodiment of the invention.

FIG. 12 shows an exemplary directory structure of the external storage 110 according to another modified embodiment of the invention. The external storage 110 of this embodiment stores setting information associated with each higher directory in a setting file associated with that higher directory. Each setting file stores the contents corresponding to each field of the setting information table 810.

In this embodiment, the external storage 110 may hold a setting file bit map in, for example, the superblock area 900 or the file storage area, which indicates whether each i-node in the i-node list area 910 shown in FIG. 9 corresponds to a setting file. Thus, the external storage manager 460 can acquire all setting information used to judge whether the directory manager 470 should be started, without tracing the directory structure from the root directory in sequence. Specifically, the external storage manager 460 can search '1' bits in the setting file bit map, and acquire the setting file using the corresponding i-node. Therefore, when this method is used, the setting file can be acquired efficiently according to this embodiment.

The external storage 110 of this embodiment stores the setting information associated with each of the higher directories in the file storage area for storing file contents. Therefore, this embodiment can be implemented without changing the file system management area. Further, if the security of each setting file is set so that only the administrator of the external storage 110 or the external storage manager 460 can access, it is possible to prevent someone other than the administrator of the external storage 110 or something other than the external storage manager 460 from reading, changing or deleting that setting file.

As described above, according to the external storage manager 460 of this embodiment, setting information for specifying the execution timing of the directory manager 470, the type of the directory manager 470 to be executed, the parameter to be given to the directory manager 470, and the like can be displayed in association with the higher directory, and changed. Therefore, the administrator of the external storage 110 can simplify the file management operations by using the external storage manager 460 to set the directory manager 470.

While the present invention has been described with reference to the preferred embodiments, the technical scope of the invention is not limited to the embodiments. Various modifications or improvements can be added to the embodiments. As seen from the claims, those embodiments so modified or improved can also be included in the technical scope of the invention.

For example, the external storage manager 460 may be executed on plural computers belonging to the computing system 100. For example, the computers 120a and 120b may respectively execute the external storage manager 460. In this case, the computers 120a and 120b can update the setting information part 1120 independently as long as they exclusively access the setting information part 1120. Also, both the computers 120a and can execute the directory manager 470 based on the setting information stored in the setting information part 1120.

Further, the setting information in the setting information part 1120, the setting table 1010, or the setting file in FIG. 12 may be stored in a storage other than the external storage 110. That is, the setting information relating to the external storage 110 may be stored in, for example, a storage in the computer 120a, or any one of the ROM 320, the RAM 330, the hard disk drive 350, the floppy disk 390, and the CD-ROM 395 in the computer 120b.

What is claimed is:

1. An apparatus for managing an external network attached storage storing one or more files and/or lower directories in association with a higher directory, said apparatus causing a computer to be equipped with:
a directory acquiring module configured to acquire a name of said higher directory;
a setting acquiring module configured to acquire execution timing of a directory manager for operations comprising a backup operation, a restore operation, a virus checking operation, a virus extermination operation, a compression operation, and a decompression operation, contained within said higher directory, which manages said files and/or said lower directories associated with said higher directory;
a directory displaying module configured to display on a screen said name of said higher directory acquired by said directory acquiring module; and
a setting displaying module configured to display on the screen said execution timing of said directory manager associated with said higher directory on condition that said higher directory displayed by said directory displaying module has been selected.

2. The apparatus of claim 1, further causing said computer to be equipped with:
a setting inputting module configured to input a change of said setting information corresponding to said higher directory displayed by said setting displaying module; and
a setting changing module configured to update said execution timing of said directory manager corresponding to said higher directory based on the contents of said inputted change.

3. The apparatus of claim 2, wherein:
said external network attached storage is configured to store said execution timing relating to said higher directory in a storage area corresponding to said higher directory; and
said setting changing module is configured to cause said computer to update said execution timing stored in said storage area of said external network attached storage.

4. The apparatus of claim 2, wherein:
said external network attached storage is configured to store execution timings relating to plural higher directories of the external network attached storage in a setting table provided in a storage area of said external network attached storage; and said setting changing module is configured to cause said computer to update said execution timings displayed by said setting displaying module in said setting table of said external network attached storage.

5. The apparatus of claim 2, wherein:

said external network attached storage is configured to store said execution timing in a file system management area storing information used for management of the file by a file system which stores said file in said external network attached storage in response to a request from an application program creating said file; and said setting changing module is configured to cause said computer to update said execution timing displayed by said setting displaying module in said file system management area of said external network attached storage.

6. The apparatus of claim 5, further comprising a backup processing module configured to acquire said execution timing associated with said higher directory from said file system management area at the time of backup of said higher directory, and back up said higher directory together with said files and/or said lower directories associated with said higher directory.

7. The apparatus of claim 6, further comprising a backup restoring module for restoring said execution timing associated with said higher directory when said higher directory is restored in said external network attached storage.

8. The apparatus of claim 1, wherein said execution timing comprises information to specify execution date and time when said directory manager is to be executed, further causing said computer to execute said directory manager based on said specified execution date and time.

9. The apparatus of claim 1, wherein said execution timing comprises information specifying an execution interval for execution of said directory manager, further causing said computer to be equipped with execution module for executing said directory manager each time a period designated by said execution interval passes.

10. A file system management apparatus for storing in external network attached storage one or more files and/or lower directories in association with a higher directory, comprising:

a file system management area for storing information to be used by a file system to manage a file, said file system storing said file in said recording medium in response to a request from an application generating said file; and a file storage area for storing the contents of said file, wherein said file system management area includes:

a name part for storing a name of said higher directory; and a setting information part for storing information identifying execution timing of a directory manager for operations comprising a backup operation, a restore operation, a virus checking operation, a virus extermination operation, a compression operation, and a decompression operation, contained within by said higher directory, which manages said files or said lower directories associated with said higher directory.

11. A computing system for storing one or more files and/or lower directories in association with a higher directory and for managing external network attached storage, the system comprising:

an external network attached storage in a storage area corresponding to said higher directory, said external network attached storage storing execution timing of a directory manager for operations comprising a backup operation, a restore operation, a virus checking operation, a virus extermination operation, a compression operation, and a decompression operation that is configured to manage said files and/or lower directories associated with said higher directory; and a management module comprising:

a directory acquiring module for acquiring a name of said higher directory;

a setting acquiring module for acquiring said execution timing associated with said higher directory;

a directory displaying module for displaying on a screen said name of said higher directory acquired by said directory acquiring module; and a setting displaying module for displaying on the screen said execution timing of said directory manager contained within said higher directory on condition that said higher directory displayed by said directory displaying module has been selected.

12. A method for managing an external network attached storage storing one or more files and/or lower directories in association with a higher directory, comprising:

acquiring a name of said higher directory;

acquiring execution timing of a directory manager for operations comprising a backup operation, a restore operation, a virus checking operation, a virus extermination operation, a compression operation, and a decompression operation, contained within said higher directory, which manages said files and/or said lower directories associated with said higher directory;

displaying on a screen said name of said higher directory acquired by said directory acquiring module; and displaying on the screen said execution timing of said directory manager associated with said higher directory on condition that said higher directory displayed by said directory displaying module has been selected.

13. The method as set forth in claim 12, further comprising:

inputting a change of said setting information corresponding to said higher directory displayed by said setting displaying module; and updating said execution timing of said directory manager corresponding to said higher directory based on the contents of said inputted change.

14. The method as set forth in claim 12, further comprising:

storing said execution timing relating to said higher directory in a storage area corresponding to said higher directory; and causing said computer to update said execution timing stored in said storage area of said external network attached storage.

15. The method as set forth in claim 13, wherein:

storing execution timings relating to plural higher directories of the external network attached storage comprises storing the execution timings in a setting table provided in a storage area of said external network attached storage; and causing said computer to update said execution timings displayed by said setting displaying module, in said setting table of said external network attached storage.

16. The method as set forth in claim 13, wherein:

said execution timing are stored in a file system management area storing information used for management of the file by a file system which stores said file in said external network attached storage in response to a request from an application program creating said file; and said computer updates said execution timing displayed by said setting displaying module in said file system management area of said external network attached storage.

17. The method as set forth in claim 16, further comprising:
equipping said computer with backup processing module for acquiring said execution timing associated with said higher directory from said file system management area at the time of backup of said higher directory, and backing up said higher directory together with said files and/or said lower directories associated with said higher directory.

18. The method as set forth in claim 17, further comprising
equipping said computer with backup restoring module for restoring said execution timing associated with said higher directory when said higher directory is restored in said external network attached storage.

19. The method as set forth in claim 12, wherein said execution timing comprises information to specify execution date and time when said directory manager is to be executed, further causing said computer to be equipped with execution module for executing said directory manager based on said specified execution date and time.

20. The method as set forth in claim 12, wherein said execution timing comprises information to specify an execution interval for execution of said directory manager, further causing said computer to be equipped with execution module for executing said directory manager each time a period designated by said execution interval passes.

21. An apparatus for managing an external network attached storage storing one or more files and/or lower directories in association with a higher directory, said program causing a computer to be equipped with:
directory acquiring means for acquiring a name of said higher directory;
setting acquiring means for acquiring execution timing of a directory manager for operations comprising a backup operation, a restore operation, a virus checking operation, a virus extermination operation, a compression operation, and a decompression operation, contained within said higher directory, which manages said files and/or said lower directories associated with said higher directory;
directory displaying means for displaying on a screen said name of said higher directory acquired by said directory acquiring means; and
setting displaying means for displaying on the screen said execution timing of said directory manager associated with said higher directory on condition that said higher directory displayed by said directory displaying means has been selected.

22. The apparatus as set forth in claim 21, further comprising:
setting inputting means for inputting a change of said setting information corresponding to said higher directory displayed by said setting displaying means; and
setting changing means for updating said execution timing of said directory manager corresponding to said higher directory based on the contents of said inputted change.

23. An article of manufacture comprising a program storage medium readable by a processor and embodying one or more instructions executable by the processor to perform a method of managing an external network attached storage storing one or more files and/or lower directories in association with a higher directory, the method comprising:
acquiring a name of said higher directory;
acquiring execution timing of a directory manager for operations comprising a backup operation, a restore operation, a virus checking operation, a virus extermination operation, a compression operation, and a decompression operation, contained within by said higher directory, which manages said files and/or said lower directories associated with said higher directory;
displaying on a screen said name of said higher directory acquired by said directory acquiring means;
displaying on the screen said execution timing of said directory manager associated with said higher directory on condition that said higher directory displayed by said directory displaying means has been selected;
inputting a change of said setting information corresponding to said higher directory displayed by said setting displaying means;
updating said execution timing of said directory manager corresponding to said higher directory based on the contents of said inputted change;
storing said execution timing relating to said higher directory in a storage area corresponding to said higher directory;
causing said computer to update said execution timing stored in said storage area of said external network attached storage;
storing said execution timing relating to said higher directory in a storage area corresponding to said higher directory;
causing said computer to update said execution timing stored in said storage area of said external network attached storage;
said execution timing is stored in a file system management area storing information used for management of the file by a file system which stores said file in said external network attached storage in response to a request from an application program creating said file; and
said computer updates said execution timing displayed by said setting displaying means in said file system management area of said external network attached storage.

* * * * *